(12) United States Patent
Kawaguchi et al.

(10) Patent No.: US 9,113,024 B2
(45) Date of Patent: Aug. 18, 2015

(54) APPARATUS AND METHOD FOR IMAGE PROCESSING USING COLOR IMAGE DATA AND LOW FREQUENCY IMAGE DATA

(75) Inventors: Zenya Kawaguchi, Tokyo (JP); Takayuki Hara, Yokohama (JP); Shutaro Kunieda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/697,109

(22) PCT Filed: May 6, 2011

(86) PCT No.: PCT/JP2011/002551
§ 371 (c)(1),
(2), (4) Date: Nov. 9, 2012

(87) PCT Pub. No.: WO2011/142105
PCT Pub. Date: Nov. 17, 2011

(65) Prior Publication Data
US 2013/0063623 A1   Mar. 14, 2013

(30) Foreign Application Priority Data
May 11, 2010   (JP) .................................. 2010-109548

(51) Int. Cl.
*H04N 5/228*   (2006.01)
*H04N 5/76*   (2006.01)
*H04N 9/73*   (2006.01)
*H04N 5/217*   (2011.01)
*H04N 7/12*   (2006.01)
(Continued)

(52) U.S. Cl.
CPC ............... *H04N 9/045* (2013.01); *H04N 5/213* (2013.01); *H04N 5/23229* (2013.01)

(58) Field of Classification Search
CPC ....... H04N 9/045; H04N 5/217; H04N 5/142; H04N 9/735; H04N 5/225; H04N 5/3658; G03B 5/00; G03B 2217/005; G03B 5/02
USPC ........ 348/438.1, 241, E5.078, E9.051, 222.1, 348/221.1–231.9; 382/167
See application file for complete search history.

(56) References Cited

U.S. PATENT DOCUMENTS 5,485,215 A * 1/1996 Meyer et al. ................ 348/423.1
5,596,418 A * 1/1997 Strolle et al. .................. 386/304
(Continued)

FOREIGN PATENT DOCUMENTS

EP   1885135 A1   2/2008
EP   2003877 A1   12/2008
(Continued)

*Primary Examiner* — Chia-Wei A Chen
(74) *Attorney, Agent, or Firm* — Canon USA Inc IP Division

(57) ABSTRACT

An image processing apparatus can execute appropriate image processing while preventing increase in a capacity of a memory for storing a plurality of pieces of image data of different frequency bands. The image processing apparatus stores first image data having the highest frequency among the plurality of pieces of image data of different frequency bands in a state in which each pixel of the first image data includes a color component signal of any of a plurality of colors, on the memory, and further stores second image data and third image data whose frequency bands are lower than that of the first image data on the memory, in a state in which a part of or all pixels of the second and the third image data have color component signals of a plurality of colors.

14 Claims, 6 Drawing Sheets

↓ R SIGNAL IS SET AS TARGET       ↘ G SIGNAL IS SET AS TARGET

↓ DOWNSAMPLE IMAGE DATA TO HALF THE ORIGINAL SIZE        ↓ DOWNSAMPLE IMAGE DATA TO HALF THE ORIGINAL SIZE

WHERE Gdn = (G(n−1)+G(n+1)) / 2

(51) Int. Cl.
*G06K 9/00* (2006.01)
*H04N 9/04* (2006.01)
*H04N 5/213* (2006.01)
*H04N 5/232* (2006.01)

(56) References Cited

U.S. PATENT DOCUMENTS

| | | | |
|---|---|---|---|
| 5,604,602 A * | 2/1997 | Guillotel et al. | 386/308 |
| 6,067,383 A * | 5/2000 | Taniguchi et al. | 382/240 |
| 7,031,535 B2 * | 4/2006 | Yamamoto | 382/240 |
| 7,701,495 B2 | 4/2010 | Higashitsutsumi et al. | |
| 8,237,822 B2 * | 8/2012 | Chang et al. | 348/241 |
| 8,610,800 B2 * | 12/2013 | Ikedo | 348/241 |
| 2005/0276475 A1 * | 12/2005 | Sawada | 382/167 |
| 2006/0038899 A1 * | 2/2006 | Tamaru et al. | 348/241 |
| 2006/0098869 A1 * | 5/2006 | Chen | 382/167 |
| 2008/0093533 A1 | 4/2008 | Onodera | |
| 2008/0122953 A1 * | 5/2008 | Wakahara et al. | 348/241 |
| 2008/0193034 A1 | 8/2008 | Wang | |
| 2009/0169126 A1 * | 7/2009 | Masuda et al. | 382/255 |
| 2009/0303553 A1 | 12/2009 | Sugiyama | |
| 2010/0039538 A1 * | 2/2010 | Ikedo | 348/241 |
| 2010/0091147 A1 * | 4/2010 | Nomura et al. | 348/279 |
| 2010/0097491 A1 * | 4/2010 | Farina et al. | 348/223.1 |
| 2010/0104180 A1 * | 4/2010 | Chiang | 382/167 |
| 2010/0201853 A1 * | 8/2010 | Ishiga | 348/280 |
| 2010/0283866 A1 * | 11/2010 | Numata | 348/223.1 |
| 2011/0090381 A1 * | 4/2011 | Cote et al. | 348/246 |
| 2011/0115950 A1 * | 5/2011 | Wach | 348/241 |
| 2013/0093925 A1 * | 4/2013 | Nashizawa | 348/239 |
| 2014/0270519 A1 * | 9/2014 | Choe et al. | 382/167 |

FOREIGN PATENT DOCUMENTS

| | | |
|---|---|---|
| JP | 2005-275581 A | 10/2005 |
| JP | 2008-015741 A | 1/2008 |
| JP | 2009-077274 A | 4/2009 |
| RU | 2338330 C2 | 11/2008 |

* cited by examiner

| R | G | R | G |
|---|---|---|---|
| G | B | G | B |
| R | G | R | G |
| G | B | G | B |

APPARATUS AND METHOD FOR IMAGE PROCESSING USING COLOR IMAGE DATA AND LOW FREQUENCY IMAGE DATA

TECHNICAL FIELD

The present invention relates to a technique for combining a plurality of pieces of image data of different frequency bands, which is generated based on one piece of image data and subjected to image processing.

BACKGROUND ART

Figure 4:
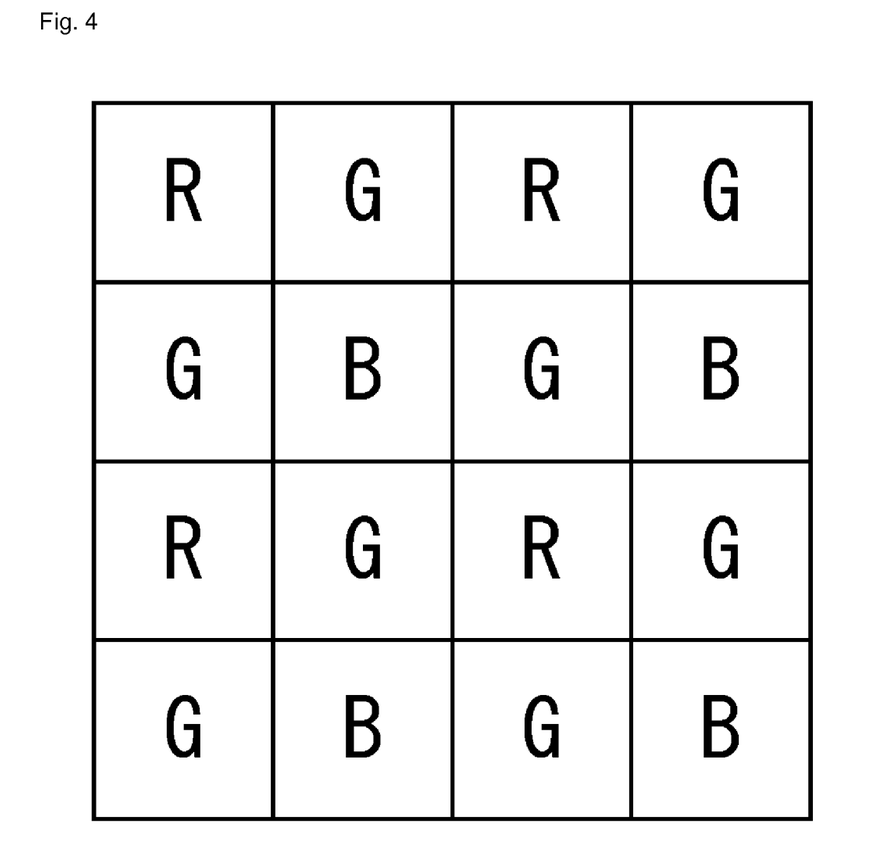
FIG. 4 illustrates a pixel pattern of the Bayer array.

In general, an image pickup apparatus, such as a digital camera or a video camera, reads image data from an image sensor, such as a charge-coupled device (CCD) or complementary metal oxide semiconductor (CMOS) sensor, and executes various image processing including gamma correction, pixel interpolation, matrix transform, and the like. An image sensor constituted by one plate includes color filters for a plurality of colors. In an image sensor like this, one color filter for any of the plurality of colors is provided to each pixel. As illustrated in FIG. 4, an image sensor having the Bayer array, which includes color filters for the primary colors of red (R), green (G), and blue (B) (RGB), generally has the following recursive pixel pattern. More specifically, in the recursive pixel pattern, one 2 vertical*2 horizontal pixel block of four pixels includes one R pixel and one B pixel, which are diagonally provided, and the other two G pixels, which are reversely diagonally provided.

Image data read from an image sensor may generally include noise components, which may arise on a constituent circuit of the image sensor. Further, a phenomenon of false color may occur in image data read from an image sensor. Accordingly, image data is subjected to image processing for reducing the above-described unnecessary signal components.

For example, there is a conventional method that reduces unnecessary signal components included in image data by separating input image data into a plurality of pieces of image data of different frequency bands and by combining the plurality of pieces of image data of different frequency bands together later.

A method discussed in Japanese Patent Application Laid-Open No. 2008-015741 first hierarchically executes low-pass filtering (LPF) processing and reduction processing on image data to separate the input image data into a plurality of pieces of image data of different frequency bands. Then high band components of the plurality of pieces of image data corresponding to each frequency band are subjected to noise reduction according to edge information which is calculated based on low band components of the image data of each frequency band. Subsequently, the image data of high frequency bands, each of which having been subjected to the noise reduction, and the image data of low frequency bands is combined together.

A configuration of a common image processing unit which first separates input image data into a plurality of pieces of image data of different frequency bands and combines the plurality of pieces of image data of different frequency bands together later will be described in detail below with reference to FIG. 5.

Figure 5:
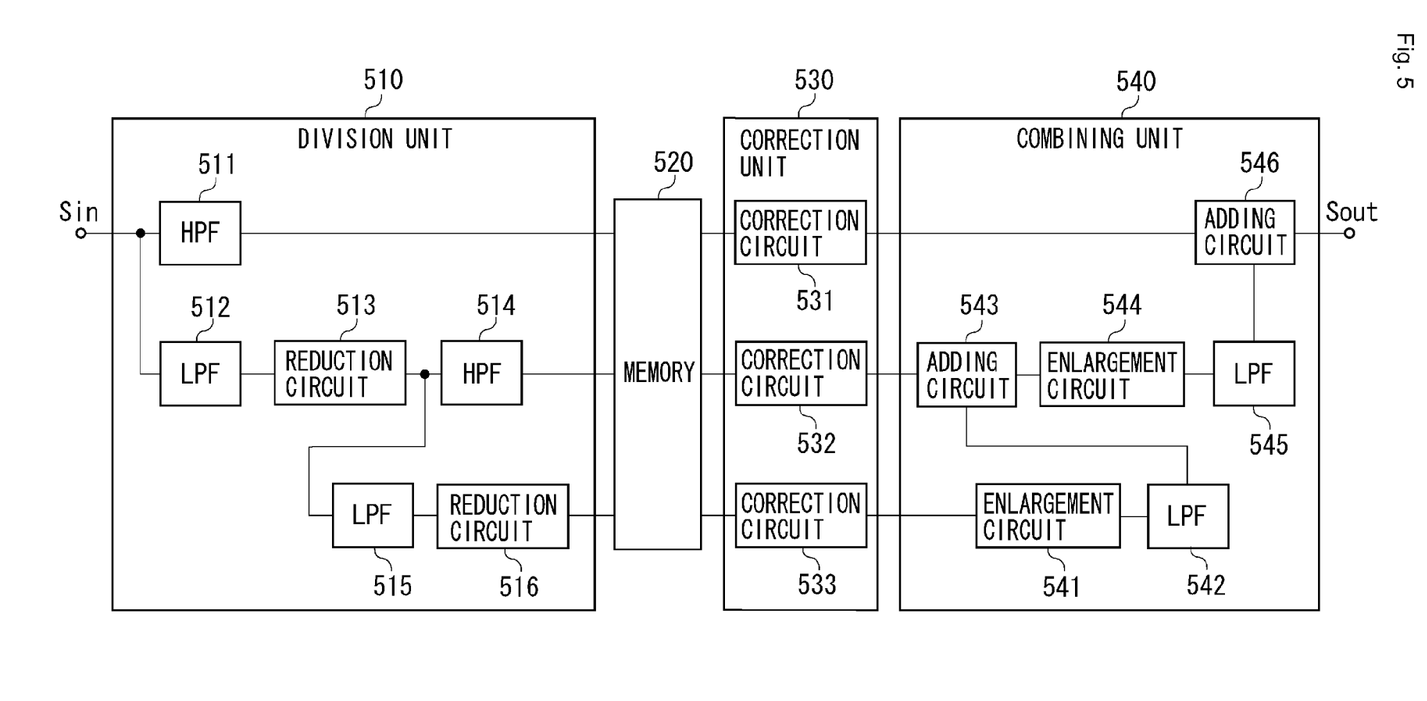
FIG. 5 is a block diagram illustrating a general configuration of a conventional image processing unit that executes processing for combining a plurality of pieces of image data of different frequency bands together.

Referring to FIG. 5, an image processing unit includes a division unit 510, a memory 520, a correction unit 530, and a combining unit 540. The division unit 510 divides input image data into a plurality of pieces of image data of different frequency bands. The correction unit 530 executes correction on the image data of each frequency band. The combining unit 540 combines the image-processed plurality of pieces of image data of different frequency bands together.

The division unit 510 outputs input image data Sin to the memory 520 as image data of a first frequency band. The division unit 510 then inputs the input image data Sin to a high-pass filter (HPF) 511. Further, the division unit 510 outputs image data generated by extracting high frequency components to the memory 520 as the image data of the first frequency band. The division unit 510 then inputs the input image data Sin to a low-pass filter 512 to execute smoothing on the image data Sin. Subsequently, the smoothed image data is input to a reduction circuit 513. Accordingly, image data of pixels less than those of the input image data Sin is generated. Further, the division unit 510 inputs the image data to a high-pass filter 514. Moreover, the division unit 510 outputs image data generated by extracting high frequency components to the memory 520 as image data of a second frequency band.

In addition, a low-pass filter 515 executes smoothing on the image data generated by the reduction circuit 513. The smoothed image data is then input to a reduction circuit 516. Accordingly, image data of pixels less than those of the image data generated by the reduction circuit 513 is generated. The image data is then output to the memory 520 as image data of a third frequency band. The frequency band is the highest in the first frequency band and becomes lower to the second and the third frequency bands in this ascending order.

In the division unit 510 illustrated in FIG. 5, the high-pass filter, the low-pass filter, and the reduction circuit constitute one band division circuit. In other words, the division unit 510 includes two band division circuits which are provided in a tree-like configuration.

The correction unit 530 includes three correction circuits 531 through 533 which correspond to the image data of the first through the third frequency bands, respectively. The correction circuits 531 through 533 executes various processing, such as noise reduction and edge information storage processing for generating a high definition image, or aberration correction, on the image data of each frequency band read from the memory 520.

The combining unit 540 inputs the image data of the third frequency band, which has been processed by the correction circuit 533, to an enlargement circuit 541 to generate image data of the same number of pixels as that of the image data of the second frequency band, which has been processed by the correction circuit 532. Then the generated image data is smoothed by a low-pass filter 542. An adding circuit 543 adds the image data of the second frequency band processed by the correction circuit 532 to the image data output from the low-pass filter 542. An enlargement circuit 544 generates image data of the same number of pixels as that of the image data of the first frequency band, which has been processed by the correction circuit 531, based on the image data output from the adding circuit 543. The generated image data is then smoothed by a low-pass filter 545. An adding circuit 546 adds the image data of the first frequency band processed by the correction circuit 531 to the image data output from the low-pass filter 545 to generate output image data Sout.

In the combining unit 540 illustrated in FIG. 5, the enlargement circuit, the low-pass filter, and the adding circuit constitute one band combining circuit. In other words, the combining unit 540 includes two band combining circuits which are provided in a tree-like configuration.

As described above, in image data acquired by an image sensor having primary color filters of the Bayer array, which includes color filters for a plurality of colors arranged in a mosaic-like arrangement, a pixel value corresponding to only one of the plurality of colors can be acquired from one pixel.

However, Japanese Patent Application Laid-Open No. 2008-015741 does not discuss any method for processing image data whose each pixel includes a signal corresponding to any color of the plurality of colors of the color filters.

Figure 6:
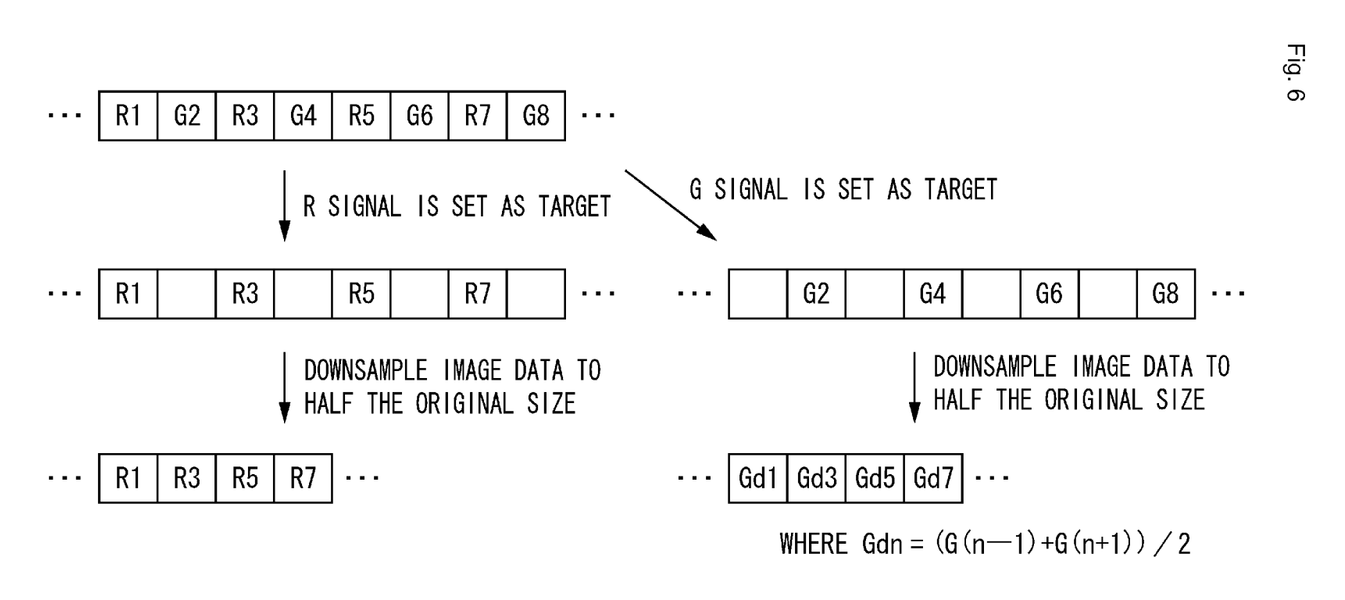
FIG. 6 illustrates synchronization of image data by reduction by downsampling.

In the case of a single plate image sensor with a primary color Bayer array, each pixel of the image sensor can have signals of all color components by executing reduction processing, which is implemented by downsampling executed when the image data is divided into a plurality of pieces of image data of different frequency bands, without interpolation on pixels having zero signals for each color. As illustrated in FIG. 6, to particularly describe a specific row of an image sensor having the Bayer array, an R signal color filter and a G signal color filter are recursively arranged in this order. A conventional method for reducing the number of pixels arranged in this manner to half the original number in the horizontal direction will be described below. To particularly describe the R signals of the specific row, the R signals which are originally arranged in the period of one R pixel for two pixels are reduced into one signal for one pixel by the reduction processing. Similarly, to specifically describe the G signals of the same row, the G signals which are originally arranged in the period of one G pixel for two pixels are reduced into one signal for one pixel by the reduction processing. However, during the processing for reducing the G signals, in order to align a barycentric position of the G signals with a barycentric position of the R signals, a value of the barycentric position is calculated by averaging pixel values of adjacent pixels. By executing reduction in the above-described manner, signals of all the color components of RGB primary colors can be generated at one pixel position without interpolation on pixels having zero signals for each color. In general, to generate signals of a plurality of colors for the same pixel is generally described as synchronization.

Because the image data of the second frequency band and the image data of the third frequency band have been synchronized by the reduction, the image data of the second frequency band and the image data of the third frequency band can be stored on the memory 520 in the synchronized state. If the synchronized image data of the second frequency band and the synchronized image data of the third frequency band is reversely converted back into image data of the Bayer array, information amount of the image data may decrease due to the reverse conversion. Thus, the accuracy of correction by the correction unit 530, which is executed by noise reduction or aberration correction, may degrade.

Suppose that the image data of the first frequency band may be subjected to the synchronization associated with the image data of the second frequency band and the image data of the third frequency band and then the synchronized image data is stored on the memory 520. However, in this case, the information amount of the image data of the first frequency band, whose information amount is the largest data, may become as three times as large. Therefore, it becomes necessary to increase the capacity of the memory 520 to an extremely large capacity.

CITATION LIST

Patent Literature

[PTL 1] Japanese Patent Application Laid-Open No. 2008-015741

SUMMARY OF INVENTION

The present invention is directed to improvement of an image processing apparatus configured to divide image data captured by an image sensor of a single plate, which includes a plurality of color filters, into a plurality of pieces of image data of different frequency bands, store the image data in a memory, and correct the plurality of pieces of image data of different frequency bands read from the memory.

According to an aspect of the present invention, an image processing apparatus includes a band division unit configured, based on first image data which includes color component signals of a plurality of colors and whose each pixel includes any of the color component signal of the color component signals of the plurality of colors, to output second image data of a frequency band lower than a frequency band of the first image data and third image data of a frequency band even lower than the frequency band of the second image data, a memory configured to store the first image data, the second image data, and the third image data, a correction unit configured to execute correction processing on the first image data, the second image data, and the third image data stored on the memory, and a combining unit configured to combine the first image data, the second image data, and the third image data together which have been corrected by the correction unit, wherein a part of or all pixels of each of the second image data and the third image data output from the band division unit include the color component signals of the plurality of colors, and wherein the memory stores the first image data in a state in which each pixel includes any of the color component signal of the color component signals of the plurality of colors and stores the second image data and the third image data in a state in which a part of or all the pixels thereof include the color component signals of the plurality of colors.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the present invention.

DESCRIPTION OF EMBODIMENTS

Various exemplary embodiments, features, and aspects of the invention will be described in detail below with reference to the drawings.

Figure 1:
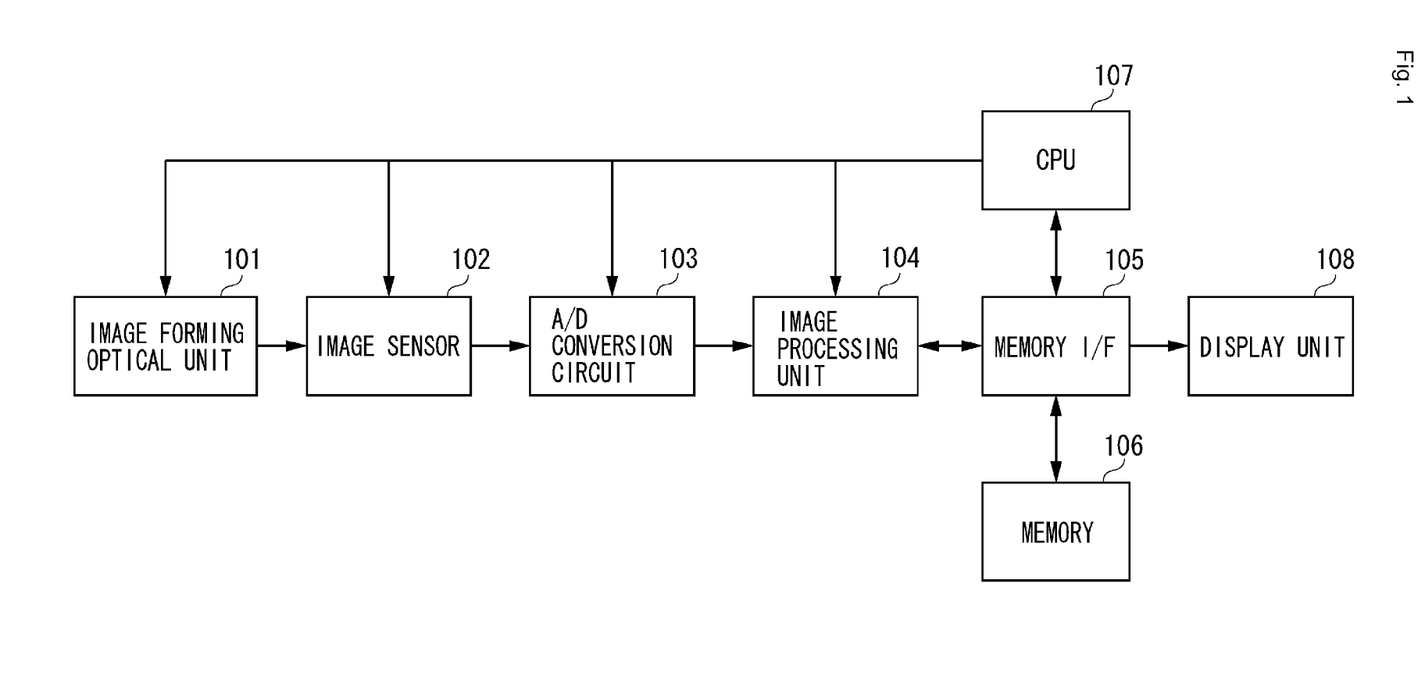
FIG. 1 is a functional block diagram of an image pickup apparatus according to an exemplary embodiment of the present invention.

FIG. 1 is a functional block diagram of an image pickup apparatus according to an exemplary embodiment of the present invention.

Referring to FIG. 1, an image forming optical unit 101 includes a lens and a diaphragm. The image forming optical unit 101 can control focusing and exposure. An image sensor 102 has a photoelectric conversion function for converting an optical image into electric signals. The image sensor 102 is constituted by a CCD or CMOS sensor. An analog-to-digital (A/D) conversion circuit 103 converts an analog image signal from the image sensor 102 into digital image data. An image processing unit 104 executes various processing, such as noise reduction, aberration correction, false color removal, gamma correction, interpolation, and matrix transform, on the image data output from the A/D conversion circuit 103.

A memory interface (I/F) 105 has a function for writing and reading image data processed by the image processing unit 104 and various control data as an interface with a memory 106 which is constituted by a dynamic random access memory (DRAM). A central processing unit (CPU) 107 executes various control operations. A display unit 108 includes a liquid crystal display (LCD) monitor. The display unit 108 serially displays image data processed by the image processing unit 104 to allow a user to observe and view a captured object image real time.

Light incident to the image forming optical unit 101 forms an image on a light-receiving surface of the image sensor 102 and a signal of the image is output from the image sensor 102 as an analog image signal. In the image sensor 102, each of R (red), G (green), and B (blue) color filters is provided to each pixel. A signal level output from each pixel corresponds to the level of any of R, G, and B signals. The A/D conversion circuit 103 converts the analog image signal into digital image data, which is a RAW image of Bayer array, and then the digital image data is input to the image processing unit 104.

Figure 2:
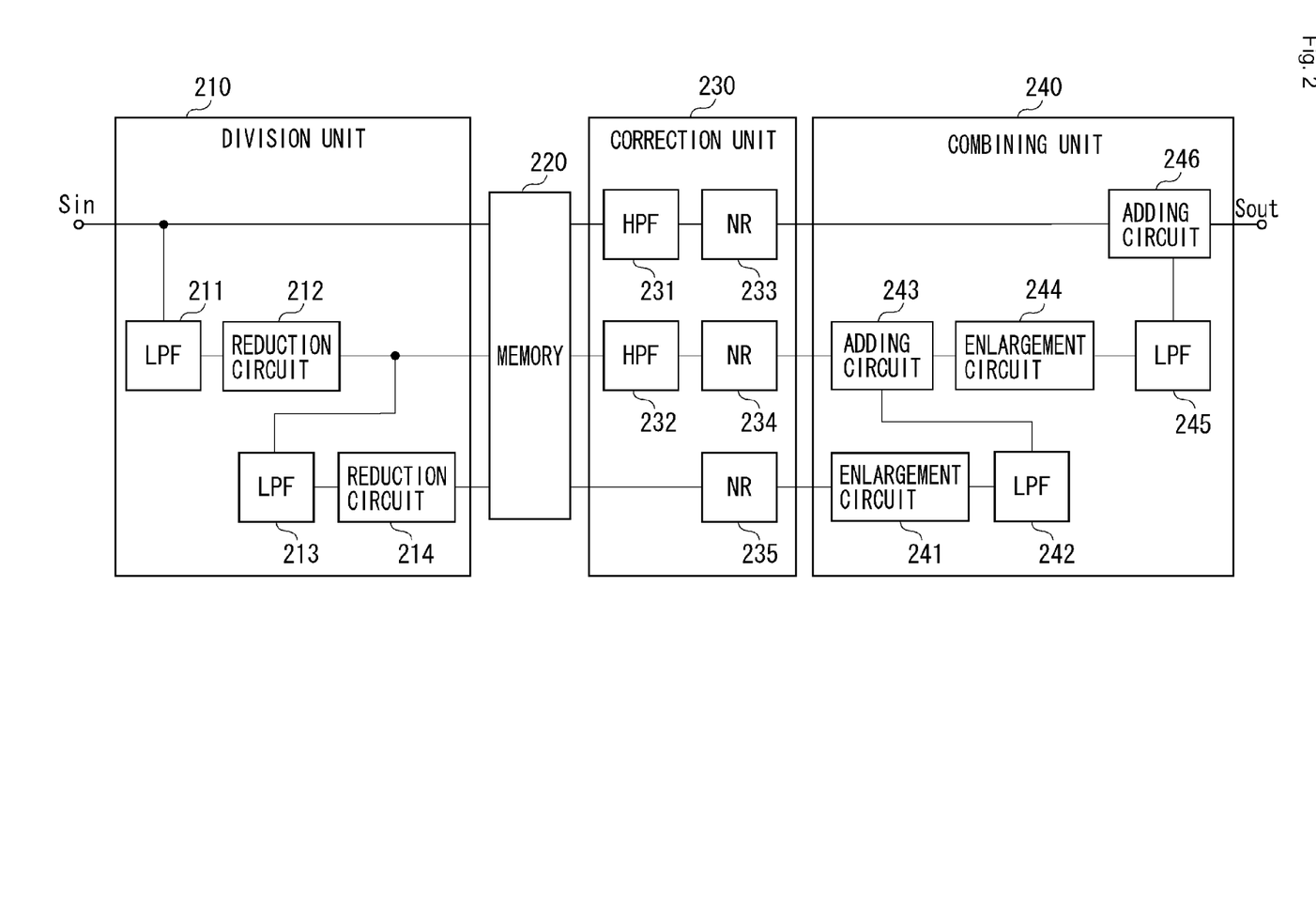
FIG. 2 is a block diagram illustrating a configuration related to noise reduction by an image processing unit according to a first exemplary embodiment of the present invention.

FIG. 2 is a block diagram illustrating a configuration related to noise reduction by the image processing unit 104 according to the first exemplary embodiment.

Referring to FIG. 2, the image processing unit 104 includes a division unit 210, a memory 220, a correction unit 230, and a combining unit 240. The division unit 210 divides input image data into image data of a plurality of different frequency bands. The correction unit 230 executes noise reduction on the image data of each frequency band. The combining unit 240 combines the image data of different frequency bands together.

The division unit 210 outputs input image data Sin as it is to the memory 220 as image data of the first frequency band.

The division unit 210 further inputs the input image data Sin to an LPF 211. After being smoothed by the LPF 211, the input image data Sin is input to a reduction circuit 212. Accordingly, image data including pixels less than those of the input image data Sin is generated. In the present exemplary embodiment, the reduction circuit 212 reduces input image data so that the number of pixels in both vertical and horizontal directions may become the half of the original number of pixels, by executing downsampling. Further, the reduction circuit 212 outputs the reduced image data to the memory 220 as image data of the second frequency band.

Moreover, the image data generated by the reduction circuit 212 is then smoothed by a low-pass filter 213. Then the smoothed image data is input to a reduction circuit 214. Thus, the reduction circuit 214 generates image data including pixels less than the image data generated by the reduction circuit 212. In the present exemplary embodiment, the reduction circuit 214 also executes downsampling on the input image data to reduce the size of the image data to the half of the original size in the vertical and the horizontal directions. The reduced image data is output to the memory 220 as image data of the third frequency band.

For example, the low-pass filters 211 and 213 can be implemented by the following transfer function.

$$H(z)=\tfrac{1}{2}*(1+Z^{-1})$$ (Math. 1)

The division unit 210 functions as a band division unit. The frequency band is the highest in the first frequency band. The second and the third frequency bands become lower in this order.

As described above, the image data of the second frequency band and the image data of the third frequency band are processed by the low-pass filter to be subjected to synchronization in which signals of all the color components of RGB colors can be generated at one pixel position. The image data of the second frequency band and the image data of the third frequency band can be stored on the memory 220 in the synchronized state.

For the image data of the first frequency band, the correction unit 230, which is a downstream unit, uses the synchronized image data. However, RAW image data having the Bayer array, which has not been synchronized yet, is stored on the memory 220. Accordingly, the present exemplary embodiment can reduce the required capacity of the memory 220 for storing image data.

The correction unit 230 reads the image data of the first through the third frequency bands from the memory 220 and executes noise reduction on the read image data. Instead of reading the entire image data at once, the correction unit 230 reads necessary pieces of image data corresponding to a region to be processed by one operation by high-pass filters 231 and 232 and noise reduction circuits 233 through 235 every time processing is executed. Accordingly, the correction unit 230 includes a memory (not illustrated) but a necessary capacity thereof is quite small compared with the capacity of the memory 220. For example, the high-pass filters 231 and 232 can be implemented by the following transfer function.

$$H(z)=\tfrac{1}{2}*(1-Z^{-1})$$ (Math. 2)

The correction unit 230 reads the image data of the first frequency band, which includes a predetermined number of pixels centered around a target pixel. The image data of the first frequency band is then processed by the high-pass filter 231. Accordingly, the correction unit 230 can extract a high band component of a region of the image data of the first frequency band centered around the target pixel. The read image data of the first frequency band, which has the predetermined number of pixels, is then input to the high-pass filter 231 to be subjected to synchronization for generating signals of color components of all the RGB colors at a position of each pixel.

The noise reduction (NR) circuit 233 uses the image data having high-band component which has been output from the high-pass filter 231 and determines a direction of an edge of the image data. More specifically, the noise reduction circuit 233 determines the direction of an edge of a region of the read image data based on the signal level of the color component of the synchronized G signal, for example. In addition, the noise reduction circuit 233 executes processing for mixing the signals in the determined direction of the edge to smooth out the image data. In the above-described manner, the present exemplary embodiment reduces noises contained in the image data.

Similarly, the correction unit 230 reads the image data of the second frequency band which includes a predetermined number of pixels centered around the target pixel, and causes the high-pass filter 232 to extract high band components from the read image data of the second frequency band. Further the correction unit 230 causes the noise reduction circuit 234 to execute noise reduction on the image data that has been processed by the high-pass filter 232.

The correction unit 230 reads the image data of the third frequency band which includes a predetermined number of pixels centered around the target pixel. Subsequently, the read image data of the third frequency band is subjected to noise reduction by the noise reduction circuit 235 without extraction of high band components by the high-pass filter.

The correction unit 230 can execute processing for correcting chromatic aberration of magnification and processing for removing false colors in addition to the noise reduction by using the image data of the first through the third frequency band. Even if processing different from the noise reduction is to be executed in the correction processing to improve the image quality, the present invention can be applied by using the synchronized image data of the second frequency band and the synchronized image data of the third frequency band.

Subsequently, the combining unit 240 inputs the image data output from the noise reduction circuit 235 to an enlargement circuit 241. The enlargement circuit 241 enlarges the image data so that the number of pixels included in the same area becomes equivalent to the number of pixels of the image data output from the noise reduction circuit 234. More specifically, the enlargement circuit 241 executes upsampling on the image data output from the noise reduction circuit 235 to increase the number of pixels in both the vertical direction and the horizontal direction to become twice as large as that before the upsampling. Subsequently, the image data subjected to the upsampling is input to a low-pass filter 242. The low-pass filter 242 executes smoothing on the image data.

An adding circuit 243 combines the image data output from the low-pass filter 242 and the image data output from the noise reduction circuit 234 together by matching spatial phases thereof. Then the combined image data is output to an enlargement circuit 244. The enlargement circuit 244 enlarges the image data so that the number of pixels in the same region becomes the same as the number of pixels of the image data output from the noise reduction circuit 233. More specifically, the enlargement circuit 244 executes upsampling on the image data output from the adding circuit 243 to increase the number of pixels in both the vertical direction and the horizontal direction to become twice as large as that before the upsampling. Subsequently, the upsampled image data is input to a low-pass filter 245. The low-pass filter 245 executes smoothing on the image data.

An adding circuit 246 combines the image data output from the low-pass filter 245 and the image data output from the noise reduction circuit 233 together by matching spatial phases thereof to generate output image data Sout corresponding to the target pixel. The image processing unit 104 executes the above-described processing on all the regions of the image data. Accordingly, image data whose noise has been reduced can be generated.

During the image data adding processing by the adding circuits 243 and 246, the image data output from the noise reduction circuits 233 and 234 is delayed to match the spatial phase of the image data to be added together. Accordingly, the correction unit 230 and the combining unit 240 can reduce the required capacity of the memory.

In order for the correction unit 230 to read the entire image data of necessary regions at a desired timing, it is required that the memory 220 stores the image data of the first through the third frequency bands for all the regions of the image data. If the image data of the first frequency band, which has the largest the number of pixels of all the pieces of image data of the first through the third frequency bands, is to be stored on the memory 220 in the synchronized state as the image data of the second frequency band and the image data of the third frequency band, it is required for the memory 220 to have a very large capacity.

In order to prevent this, in the present exemplary embodiment, the image data of the second frequency band and the image data of the third frequency band, each of which having already been synchronized by the division unit 210, is stored on the memory 220 in the synchronized state. On the other hand, the image data of the first frequency band is stored on the memory 220 without synchronizing.

The image data input to the image processing unit 104 originally includes the signal of the color component corresponding to any one color of the color filter for each color only. Accordingly, if the image data of the first frequency band is stored on the memory as it is, the information amount of the image data does not decrease. If the image data of the first frequency band is to be subjected to correction with which the Bayer array can be maintained (e.g., correction of defective pixels), the correction can be executed on the image data of the first frequency band before storing the same on the memory 220.

It can be supposed that the synchronized image data pieces of the second frequency band and the third frequency band are subjected to sampling so that each pixel has one color component signal to have the Bayer array configuration and then are stored on the memory 220, similar to the image data of the first frequency band. In this case, however, if the correction unit 230 generates an image by executing synchronization again, the information amount of the image data is less than that of the image before being provided with the Bayer array. In other words, the accuracy of the noise reduction may degrade. In order to prevent this, the present exemplary embodiment stores the image data of the second frequency band and the image data of the third frequency band on the memory 220 in the synchronized state.

The high-pass filters 231 and 232 of the correction unit 230 are not always required. If a ratio of combining the image data which is executed by the enlargement circuits 241 and 244 can appropriately vary according to the intensity of edge components included in the image data of the first frequency band, the correction unit 230 can exclude the high-pass filters 231 and 232. More specifically, the combining ratio of the image data of the frequency band may be increased as the strength of the image data included in the edge component of the first frequency band is large.

Figure 3:
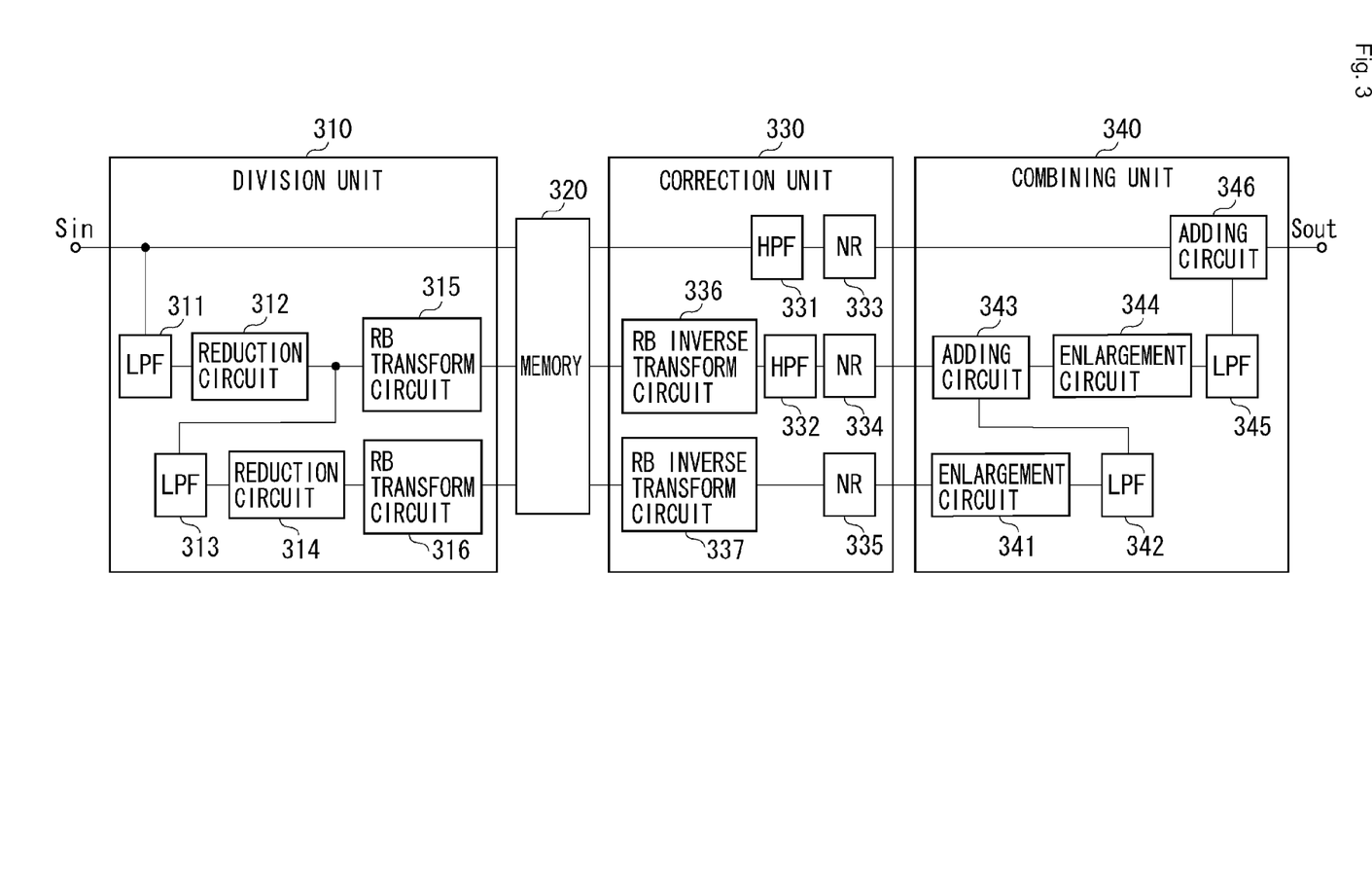
FIG. 3 is a block diagram illustrating a configuration related to noise reduction by an image processing unit according to a second exemplary embodiment of the present invention.

FIG. 3 is a block diagram illustrating a configuration of noise reduction which is executed by the image processing unit 104 according to a second exemplary embodiment of the present invention.

Referring to FIG. 3, the image processing unit 104 is constituted by a division unit 310, a memory 320, a correction unit 330, and a combining unit 340. The division unit 310 divides input image data into image data of a plurality of different frequency bands. The correction unit 330 executes noise reduction on the image data of each frequency band. The combining unit 340 combines the image data of different frequency bands together.

The memory 320 and the combining unit 340 have the configuration similar to that of the memory 220 and the combining unit 240 illustrated in FIG. 2, respectively.

In the division unit 310, a low-pass filter 311, a reduction circuit 312, a low-pass filter 313, and a reduction circuit 314 have the configuration similar to that of the low-pass filter 211, the reduction circuit 212, the low-pass filter 213, and the reduction circuit 214 illustrated in FIG. 2, respectively. Differently from the division unit 210 illustrated in FIG. 2, the division unit 310 according to the present exemplary embodiment includes red and blue color (RB) transform circuits 315 and 316.

In the correction unit 330, high-pass filters 331 and 332, and noise reduction circuits 333 to 335 have the same configuration as that of the high-pass filters 231 and 232, and the noise reduction circuits 233 to 235 in the correction unit 230 illustrated in FIG. 2, respectively. Differently from the correction unit 230 illustrated in FIG. 2, the correction unit 330 according to the present exemplary embodiment includes RB inverse transform circuits 336 and 337.

The RB transform circuits 315 and 316 executes processing for reducing a horizontal resolution of image data including signals of red and blue color components of the synchronized image data output from the reduction circuits 312 and 314 to the half of the original horizontal resolution thereof. More specifically, the image data is processed so that all pixels have signals of the green color component but a part of (the half of) the pixels only have signals of red and blue color components. For example, the image data can be thinned out by downsampling in the horizontal direction with using low-pass filtering, which is implemented by the following transfer function.

$$H(z) = \frac{1}{4} * (1 + 2*Z^{-1} + Z^{-2}) \quad \text{(Math. 3)}$$

The RB inverse transform circuits 336 and 337 executes processing for returning the horizontal resolution of the image data including the signals of the red and blue color components, whose horizontal resolution has been decreased by the RB transform circuits 315 and 316 down to half the original level, to the level twice as high. More specifically, the image data can be interpolated by upsampling the same twice as large in the horizontal direction.

Compared with a signal of a green color component, the affect from a red color component signal and a blue color component signal on the visual characteristic of image data including red, green, and blue color component signals is relatively lower. Accordingly, if the horizontal resolution of each of the red color component and the blue color component is decreased to half the original level while the horizontal resolution of the green color component is not changed, the quality of a photographed image may not be degraded very much.

Accordingly, in the present exemplary embodiment, the image data of the second frequency band and the image data of the third frequency band are stored on the memory 320 after decreasing the horizontal resolution of the red and blue color components to half the original level. Therefore, the present exemplary embodiment can reduce the required capacity and bandwidths of the memory 320.

Whether to execute the processing by the RB transform circuits 315 and 316 and the RB inverse transform circuits 336 and 337 can be changed according to an operation mode of the image pickup apparatus. A recent digital camera includes a plurality of operation modes (functions), such as a moving image recording mode and a high-speed continuous shooting mode, in addition to a still image shooting mode. In the moving image recording mode and the high-speed continuous shooting mode, it is required to provide a memory having an appropriate bandwidth to the digital camera.

If the image sensor 102 is in an operation mode in which a large bandwidth of the memory is consumed, such as the moving image recording mode or the high-speed continuous shooting mode, the processing by the RB transform circuits 315 and 316 and the RB inverse transform circuits 336 and 337 can be enabled.

On the other hand, if the image sensor 102 is in the still image recording mode, the processing by the RB transform circuits 315 and 316 and the RB inverse transform circuits 336 and 337 can be disabled. With the above-described configuration, the present exemplary embodiment can execute the noise reduction by using image data of a larger information amount compared to that in a case where the above-described processing by the RB transform circuits and the RB inverse transform circuits has been enabled. Accordingly, the present exemplary embodiment can execute the noise reduction with a high accuracy.

In each exemplary embodiment described above with reference to the corresponding drawings, different circuits are provided for processing of different contents for easier understanding. However, the above-described plurality of circuits can be implemented by an integrated circuit. On the other hand, the above-described processing by one circuit can be shared and implemented by a plurality of circuits.

As described above, each exemplary embodiment uses image data generated by the image sensor having the Bayer array and which has color filters for the RGB primary colors. However, the present invention is not limited to this configuration. In other words, the above-described processing can also be executed on image data generated by an image sensor which has color filters for complementary colors, such as yellow (Y), magenta (M), and cyan (C).

In each exemplary embodiment, image data is divided into image data of three different frequency bands. However, the present invention can be implemented by alternatively dividing image data into image data of two different frequency bands only. Further, alternatively, the present invention can be implemented if image data is divided into image data of four or more different frequency bands.

As a method for dividing image data into a plurality of pieces of image data of different frequency bands other than the above-described method, the following method can be alternatively used. More specifically, image data can be divided into a plurality of pieces of image data of mutually different frequency bands by the wavelet transformation to implement the present invention.

Further, the present invention is not limited to an image pickup apparatus. The present invention can also be implemented by a personal computer (PC), to which an image processing application is installed, if the PC can function as an image processing apparatus capable of processing image data including signals of different color components according to pixels by executing synchronization on the signals thereof.

The present invention can also be achieved by providing a system or an apparatus with a non-volatile storage medium storing program code of software implementing the functions of the embodiments and by reading and executing the program code stored on the storage medium with a computer of the system or the apparatus (a CPU or a micro processing unit (MPU)).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-109548 filed May 11, 2010, which is hereby incorporated by reference herein in its entirety.

The invention claimed is:

1. An image processing apparatus comprising:
   a band division unit configured, based on first image data which corresponds to color component signals of a plurality of colors and whose each pixel corresponds to predetermined one of the color component signals of the plurality of colors, to output second image data of a frequency band lower than a frequency band of the first image data, wherein each pixel of the second image data corresponds to all of the color component signals of the plurality of colors;
   a memory configured to store the first image data and the second image data;
   a memory interface configured to store the first image data in the memory in a state in which each pixel corresponds to predetermined one of the color component signals of the plurality of colors and store the second image data in the memory in a state in which a part of or all the pixels correspond to all of the color component signals of the plurality of colors; and
   a combining unit configured to combine the first image data and the second image data.

2. The image processing apparatus according to claim 1, wherein the color component signals of the plurality of colors include signals of red (R), green (G), and blue (B) color components.

3. The image processing apparatus according to claim 1, wherein the number of pixels of the second image data is less than the number of pixels of the first image data.

4. The image processing apparatus according to claim 1, further comprising:
   a correction unit configured to execute correction processing on the first image data and the second image data stored on the memory,
   wherein the combining unit combines the first image data and the second image data which have been corrected by the correction unit.

5. The image processing apparatus according to claim 4, wherein the band division unit generates, based on the first image data, third image data whose frequency band is lower than the frequency band of the first image data and whose each pixel corresponds to all of the color component signals of the plurality of colors, the band division unit further generates fourth image data based on the third image data by reducing the number of pixels corresponding to first and second color component signals among the color component signals of the plurality of colors of the third image data, and the band division unit still further outputs the fourth image data to the memory as the second image data, and
   wherein the correction unit executes correction processing after changing the number of pixels corresponding to the first and second color component signals of the fourth image data, which has been stored on the memory as the second image data, to be the same as the number of pixels corresponding to the first and second color component signals of the third image data.

6. The image processing apparatus according to claim 5, wherein the band division unit determines whether to output the third image data as the second image data to the memory or to output the fourth image data as the second image data to the memory according to an operation mode of an image sensor that is configured to generate the first image data.

7. The image processing apparatus according to claim 5, wherein the color component signals of the plurality of colors include signals of red (R), green (G), and blue (B) color components, and wherein the first and second color component signals respectively corresponding to any of the plurality of colors includes an R color component signal and a B color component signal.

8. The image processing apparatus according to claim 4, wherein the correction processing includes at least one of noise reduction processing, chromatic aberration of magnification correction processing, and false color removal processing.

9. The image processing apparatus according to claim 4, wherein the correction unit converts the first image data so that each pixel of the first image data corresponds to all of the color component signals of the plurality of colors and then executes the correction processing on the first image data.

10. The image processing apparatus according to claim 4, wherein the band division unit outputs fifth image data of a frequency band lower than a frequency band of the second image data based on the second image data, the memory stores the fifth image data, the correction unit executes correction processing on the fifth image data stored on the memory, and the combining unit combines the first image data, the second image data, and the fifth image data which have been corrected by the correction unit.

11. The image processing apparatus according to claim 1, wherein the memory stores the first image data which has Bayer array.

12. The image processing apparatus according to claim 1, further comprising a reduction unit that generates the second image data by down sampling each of the color component signals in the first image data and aligning them so that each pixel of the second image data corresponds to all of the color component signals of the plurality of colors.

13. A method for controlling an image processing apparatus, the method comprising:
   outputting, based on first image data which corresponds to color component signals of a plurality of colors and whose each pixel corresponds to predetermined one of the color component signals of the plurality of colors, second image data having a frequency band lower than a frequency band of the first image data, wherein each pixel of the second image data corresponds to all of the color component signals of the plurality of colors;
   storing the first image data in a memory by a memory interface in a state in which each pixel corresponds to predetermined one of the color component signals of the plurality of colors;
   storing the second image data in the memory by the memory interface in a state in which a part of or all the pixels correspond to all of the color component signals of the plurality of colors; and
   combining the first image data and the second image data.

14. A computer-readable non-volatile storage medium storing a program which causes a computer to perform a method for controlling the image processing apparatus according to claim 13.

* * * * *